(12) United States Patent
Poggi

(10) Patent No.: US 11,534,644 B2
(45) Date of Patent: *Dec. 27, 2022

(54) METHOD AND SYSTEM FOR NEUTRALIZING ASBESTOS

(71) Applicant: Paul Poggi, Clarens (CH)

(72) Inventor: Paul Poggi, Clarens (CH)

(*) Notice: Subject to any disclaimer, the term of this patent is extended or adjusted under 35 U.S.C. 154(b) by 771 days.

This patent is subject to a terminal disclaimer.

(21) Appl. No.: 16/367,300

(22) Filed: Mar. 28, 2019

(65) Prior Publication Data

US 2019/0217140 A1 Jul. 18, 2019

(30) Foreign Application Priority Data

Sep. 22, 2014 (FR) ........................................ 1458915
Mar. 21, 2016 (FR) ........................................ 1652383

(51) Int. Cl.
| | | |
|---|---|---|
| *A62D 3/30* | (2007.01) | |
| *C04B 14/40* | (2006.01) | |
| *C22B 1/00* | (2006.01) | |
| *C22B 7/00* | (2006.01) | |
| *B09B 3/00* | (2022.01) | |
| *C04B 18/04* | (2006.01) | |
| *C22B 3/06* | (2006.01) | |
| *A62D 3/36* | (2007.01) | |
| *C01B 33/20* | (2006.01) | |
| *C01B 33/12* | (2006.01) | |
| *C01F 11/46* | (2006.01) | |
| *A62D 101/41* | (2007.01) | |
| *C01B 39/00* | (2006.01) | |

(52) U.S. Cl.
CPC ................. *A62D 3/30* (2013.01); *A62D 3/36* (2013.01); *B09B 3/00* (2013.01); *B09B 3/0066* (2013.01); *C01B 33/126* (2013.01); *C01B 33/20* (2013.01); *C01F 11/46* (2013.01); *C04B 14/40* (2013.01); *C04B 14/405* (2013.01); *C04B 18/04* (2013.01); *C04B 18/0463* (2013.01); *C22B 1/005* (2013.01); *C22B 3/06* (2013.01); *C22B 7/007* (2013.01); *A62D 2101/41* (2013.01); *A62D 2203/10* (2013.01); *C01B 39/00* (2013.01); *Y02P 10/20* (2015.11)

(58) Field of Classification Search
CPC ........ A62D 3/30; A62D 3/36; A62D 2101/41; A62D 2203/10; B09B 3/00; B09B 3/0066; C01B 33/126; C01B 33/20; C01B 39/00; C01F 11/46; C04B 14/40; C04B 14/405; C04B 18/04; C04B 18/0463; C22B 1/005; C22B 3/06; C22B 7/007; Y02P 10/20
USPC ........................................................ 422/292
See application file for complete search history.

(56) References Cited

U.S. PATENT DOCUMENTS

| | | | | |
|---|---|---|---|---|
| 10,286,243 | B2 * | 5/2019 | Poggi | ........................ A62D 3/36 |
| 2018/0256930 | A1 * | 9/2018 | Poggi | ........................ A62D 3/36 |

* cited by examiner

*Primary Examiner* — Edward M Johnson
(74) *Attorney, Agent, or Firm* — PatShegen IP; Moshe Pinchas

(57) ABSTRACT

A system for asbestos neutralization, that includes a neutralization unit having a module configured for sorting of asbestos waste, an asbestos waste grinder; a concentrated sulfuric acid tank, a vat containing a hot diluted acid solution, for which temperature is between 70° C. and 100° C., in which grinded asbestos waste containing asbestos is dipped, the solution is configured for neutralizing asbestos contained in the grinded asbestos waste, a filtration unit to separate, at the end of the neutralization reaction, a solid inert waste from a liquid phase of the diluted acid solution, a regeneration unit for the diluted acid solution, which adjusts the hydrogen potential of the extracted liquid phase by adding concentrated sulfuric acid from the tank, and means for transferring the regenerated solution into the vat.

15 Claims, 9 Drawing Sheets

METHOD AND SYSTEM FOR NEUTRALIZING ASBESTOS

FIELD OF THE INVENTION

Figure 1:
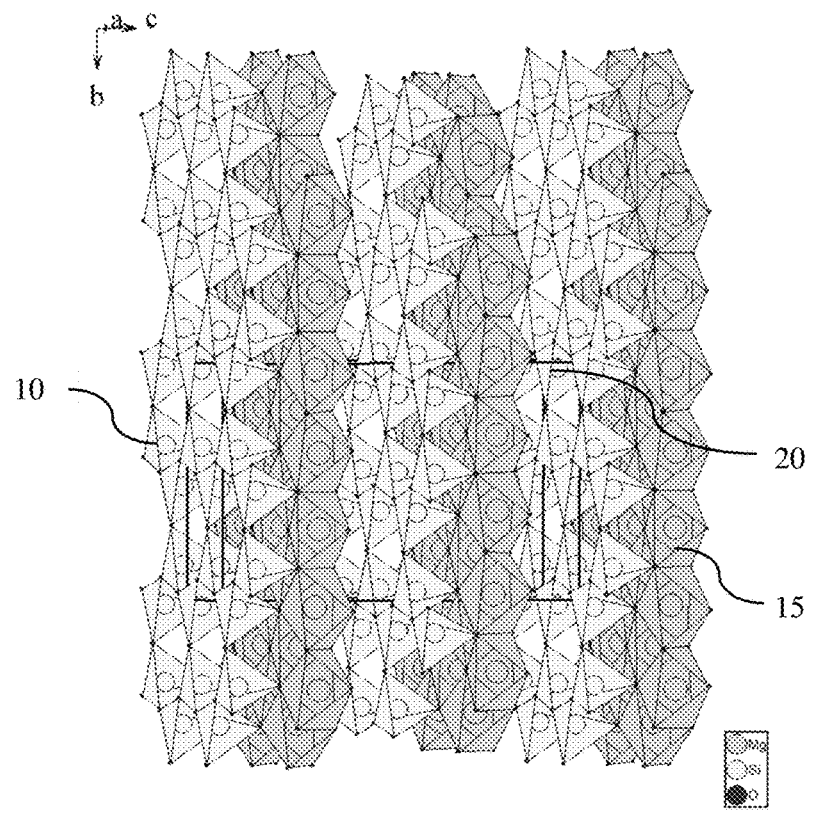

The invention concerns a method and system for neutralizing and recycling asbestos. It is particularly applicable for neutralization of asbestos in asbestos removal projects.

STATE OF THE PRIOR ART

Asbestos is not a mineral in itself. It is a generic term which designates a group of naturally metamorphic rocks, of fibrous morphology. The term "asbestos" has been adopted for purposes of commercial identification.

'Asbestos' can be divided into two major mineral subdivisions:
- the 'serpentines', of which there is one single variety—Chrysotile, and
- the 'amphiboles', which break down into five varieties, Amosite, Crocidolite, Actinolite, Anthophyllite and Tremolite.

Three varieties are available commercially:
- chrysotile (white asbestos), chemical formula $Mg_3Si_2O_5(OH)_4$,
- crocidolite (blue asbestos), chemical formula $Na_2(Mg,Fe)_3Al_2Si_8O_{22}(OH)_2$ and—
- amosite (brown asbestos), chemical formula $(Mg,Fe)_7Si_8O_{22}(OH)_2$ The Chrysotile variety represents more than 95% of the asbestos produced and consumed between 1900 and 2003.

Asbestos is a material which possesses several advantages:
- interesting physico-chemical properties such as thermal, mechanical and chemical resistance.
- a low selling price due to economic production costs.

It is for this reason that asbestos is used in more than 3000 products notably in the domain of construction materials. It is particularly to be found in:
- flocking,
- false ceilings,
- floor coverings
- insulation lagging, cladding,
- packaging,
- seals,
- wall and ceiling coverings,
- roofs and facades,
- ventilation and water ducts.

There are three major types of waste containing asbestos:
- airborne waste, originating from flocking and cladding or lagging, and from the material degradation of which the fibers can be released into the atmosphere.
- Asbestos waste or asbestos-cement which is not susceptible to disintegration and release of fibers,
- other asbestos waste such as brake linings and other products.

On disintegration, asbestos releases microscopic fibers which remain in suspension in the air and which when they are inhaled can be absorbed into the pulmonary cavities.

Research carried out on asbestos has demonstrated that the risks associated with its use exist predominantly when the asbestos takes the form of inhalable particles, notably in the guise of loose acicular fibers, the inhalation of which is susceptible to result in fibrous or cancerous formations notably in the human body giving rise to the appearance of illnesses such as lung cancer or asbestosis. Pathologies of this type have been attributed to the acicular form of asbestos fibers but equally to the effect of liberated ions on living tissues following partial dissolution of asbestos.

This can lead to the appearance of several illnesses:
- asbestosis, a pulmonary infection analogous to the silicosis of miners, benign lesions of the pleurae,
- lung cancer (increased risk where association with tobacco) and
- mesotheliomas, rare but grave cancers of the pleurae and peritoneum.

On account of these risks, waste containing asbestos is considered as dangerous industrial waste, and research has been conducted in recent years to develop techniques which would promote its confinement or its efficient elimination. It is to be noted on this subject that there exist numerous waste materials of this type which are essentially flocked asbestos from lagging material or asbestos-cement which were commonly employed, notably in France, for example in the domain of buildings and public works, up to 1997 when its fabrication, and the use of products containing asbestos fibers, was banned.

A diagnosis of the presence of asbestos is imposed by law for all works subject to an authorization for demolition or for the transformation of buildings constructed before 1 Jan. 1991. The elements containing asbestos must be removed and eliminated according to the appropriate regulations.

Two procedures for the elimination of asbestos waste are recognized as of the present: landfill and vitrification.

The first solution adopted for the management of waste containing asbestos consists in the placing of asbestos based waste in storage centers for dangerous waste. This confinement is hardly satisfactory as a solution, notably from the point of view that there is no treatment capable of rendering the waste inoffensive and leads to an accumulation of dangerous waste on a sensitive site. Additionally, the capacity for storage in these centers is not limitless and the costs are not inconsiderable. Further, the producer of the waste remains liable in terms of responsibility for as long as the asbestos exists, so forever.

The handling/storage charges of the waste are relatively expensive at a cost of about 900€ per ton (transport excluded).

Another solution currently employed consists in the vitrification of the asbestos based waste achieved by heating, typically by aid of a plasma torch, the waste to a high temperature. The vitrification of the asbestos proves certainly to be an efficient technique for treatment of asbestos as it leads to a conversion of all types of asbestos into a vitrified material which is not susceptible to the liberation of inhalable fibers from acicular asbestos. There is nevertheless a major inconvenience for this method of vitrification which is the very high cost due to a very substantial energy consumption related to the deployment of the plasma torch as well as the installation and maintenance costs implied by highly technological apparatus. The deployment cost of the vitrification process is of the order of 1350 to 3000 € per ton (net of applied taxes and excluding transport).

Further, the asbestos vitrification process has a relatively reduced capacity (22 tons per day for the only installation of this type existing in Europe,—(8000 tons per year), which is very low by comparison to the very high quantities of asbestos-based waste which currently require treatment. By way of indication, the annual quantity in France, of waste containing asbestos is of the order of 200,000 tons of flocked asbestos and 20 million tons of asbestos cement. Actually in France, there are approximately 100 million m² of buildings which are still with asbestos.

Solutions other than landfill and vitrification have been envisaged for the treatment of asbestos based waste, but which were revealed to be either non applicable in practice or less efficient than vitrification.

There was also for example a proposal to destroy the acicular structure of the asbestos fibers by subjecting the fibers to an intensive grinding with the objective to induce an amorphization of the asbestos.

Furthermore, it was proposed to perform an acid attack on the asbestos with the objective to make the acicular fibers soluble. Within this framework, a radical method consisted in subjecting the asbestos to attack by concentrated hydrofluoric acid. The results proved to be very positive but the test could only be envisaged in a laboratory environment as effectively the toxicity and the associated risks related to use of hydrofluoric acid would proscribe its employment on an industrial scale.

The use of acids other than the above mentioned hydrofluoric acid has been proposed but an attack by these alternative acids proved largely to be ineffective in the treatment of most types of asbestos. There is described for example in the document WO 97/27902 a treatment for the dissolution of asbestos by hydrochloric acid with added potassium ions and possibly by other acids, at temperatures in a range from 30 to 95°. The procedure described in this document could certainly prove to be effective with certain types of asbestos, notably the chrysotile type of asbestos but in a majority of cases proved to be unsuited for the treatment of the amphibole type of asbestos (notably the cummingtonites (especially the amosites) and the crocidolites), and particularly where concerning flocked asbestos. Numerous publications have established in fact that the effect of acid attacks on asbestos remains as a general rule limited to the surface of the acicular fibers of the asbestos, in particular where the amphibole type of asbestos is concerned. This would seem to be evident by the formation of a gel on the surface which prevents attack penetration to the core of the asbestos fibers. For further details on this subject, please refer to the article "*Dissolution of fibrous silicates in acid and buffered salt solutions*", Allen M P. and Smith R. W., Minerals Engineering, vol. 7, 1527-1537 (1994).

Other solutions envisage a procedure for treatment of a waste containing asbestos including the dissolution of the asbestos contained in the waste, by making the waste react with an acid other than hydrofluoric acid at a temperature of at least 125° and at a pressure superior to 0.2 MPa (ie; at a pressure of at least 2 bar), and wherein:

The asbestos contained in the treated waste is of the amphibole type;

The solution obtained as a result of the dissolution by acid of the asbestos is developed.

Where the valorization of by-products is concerned, the only possibility is the transformation of the asbestos into «glaze», a reusable material for buildings and public works (as sub-strata in roadworks) and sold at 10€ per ton (net of tax and excluding transport).

OBJECT OF THE INVENTION

The presented invention is intended to remedy all or part of the above inconveniences.

To this effect, according to its first aspect, the presented invention relates to a system for neutralization of asbestos that comprises a mobile neutralization unit comprising:

an asbestos waste sorting module,
an asbestos grinder
a hot acid bath for rendering the asbestos inert.

This mobile approach presents not only a solution for the amorphization of the asbestos but also for the reduction of costs as avoiding its disposal into a specific storage depot and the transport of the asbestos, since the asbestos is no longer existing. For information the transport and the storage of dangerous material such as asbestos are subject to strict and complex regulations which render its disposal very expensive.

In embodiments, the asbestos waste sorting module comprises:

a window with glove boxes and
a conveyor for transporting the asbestos waste in front of the window As a result of these arrangements the operators in charge of the sorting do not require either to wear special clothing or to follow a complex procedure to gain entry to a dangerous atmosphere.

In embodiments, the system object of the presented invention comprises a means of confinement of the atmosphere in the mobile neutralization unit.

As a result of these arrangements it is possible to reduce, eliminate even, the risk of asbestos particles escaping from the mobile unit.

In embodiments, the hot acid bath of the mobile neutralization unit consists of sulfuric acid.

Sulfuric acid has the advantage of presenting a reduced cost of return and to react with all types of commercial asbestos.

In embodiments, the hot acid is transported in the hot acid bath of the mobile neutralization unit at a temperature comprised between 70° C. and 100° C.

In embodiments, the hot acid is transported in the hot acid bath of the mobile neutralization unit at a temperature comprised between 80° C. et 100° C.

As a result of each of these arrangements the chemical reaction is rapid and effective.

In embodiments, the system, object of the present invention, comprises a vehicle trailer forming a support to the mobile neutralization unit.

As a result of these arrangements, the deployment of the mobile unit on site is facilitated, the movement of the mobile neutralization unit being possible on the road network.

It is to be noted that the trailer is preferably equipped with a technical bay which would not only allow to make the apparatus operable in accordance with the regulated safety conditions in force, but also to monitor/verify/operate/register the global functional parameters of the mobile neutralization unit in order to be capable of responding at all times to a sanitary inspection and to execute maintenance or repair operations.

In embodiments, the system, object of the present invention, comprises a boat forming a support to the mobile neutralization unit.

As a result of these arrangements the asbestos removal from a ship is facilitated, the boat carrying the mobile neutralization unit being capable of taking up position in proximity to or to berth alongside the ship being the subject of the asbestos removal.

In embodiments, the system object of the present invention comprises a vehicle equipped with a motor, the hot acid bath being heated by the motor of the vehicle.

As a result of these arrangements, the mobile unit itself does not have a motor and is therefore simpler and less costly.

In embodiments, the system object of the present invention comprises a generator, the hot acid bath being heated by means of electrical heating supplied by the generator. As a result of these arrangements, a vehicle carrying the mobile unit can supply the electricity to the mobile unit.

In embodiments, the mobile unit can be housed in a standard 40-foot long container. As a result of these arrangements, the mobile unit can easily be transported by truck, train, ship or plane.

In embodiments, the mobile neutralization unit further comprises:
   a tank for fresh water;
   a tank for used water;
   a decontamination chamber for the operator;
   a chamber for the introduction of asbestos based waste and
   an evacuation channel for sorted non-asbestos waste.

The freshwater and used water tanks allow for the entirety of the asbestos-based waste to be treated by means of moisture, by addition of clear water in order to on the one hand limit the amount of dust in suspension and on the other to fluidify the circulation of waste.

In embodiments, the asbestos waste sorting module comprises:
   a workbench,
   a conveyor belt and
   a metal detection unit.

Resulting from these arrangements, an efficient sorting is performed, while at the same time reducing the effort required on the part of the sorting operator. What is more, metals which could pollute the acid bath are detected and withdrawn before introduction of the asbestos waste in the hot acid bath.

In embodiments, the hot acid bath is contained in an insulated tank which can be dismounted from the mobile neutralization unit.

As a result of these arrangements the stocking of the mobile unit is simplified and the continuity of its deployment can be ensured by complete replacement of the tank.

In this way the acid can be replaced as often as required, and the residue from the asbestos neutralization can be removed. Preferably the clean water reserves can be replenished and the used water evacuated simultaneously with the changing of the acid bath.

In this approach for asbestos waste treatment, the mobile units remain deployed on the site during the entire Site operation and are simply supplied with "new" tanks of fresh water and acid and the used tanks are recuperated and transported on "standard" trucks to a treatment plant.

In embodiments, the system, object of the present invention, comprises a supply vehicle comprising:
   a means for the dismounting of a tank from the mobile neutralization unit containing the used bath acid.
   a means for the loading of a tank of pre-heated acid into the mobile neutralization unit,
   a means of emptying a tank of used water or the exchange of a tank of used water with an empty tank.
   a means of refilling a tank of fresh water or exchange with a tank of fresh water.

As a result of these arrangements the restocking of the mobile unit is simplified and the continuity of its deployment can be ensured by complete replacement of the tank.

This vehicle participates in the approach for the treatment of asbestos waste wherein the mobile units remain deployed on the Site for the duration of the works and are simply restocked in consumables, fresh water and new acid, and the used water and used acid are recuperated and transported on "standard" trucks to a treatment plant.

In embodiments, the system, the object of the present invention, comprises a fixed supply unit comprising:
   a means for the dismounting of a tank from the mobile neutralization unit and which contains the used acid bath.
   a means of loading a tank of preheated acid into the mobile neutralization unit
   a means of emptying a tank of used water or exchange of a tank of used water with an empty tank.
   a means of refilling a tank with fresh water or its exchange with a tank of fresh water and
   a means of transferring functional data of the mobile neutralization unit from the said mobile unit to a secured database of the fixed unit.

As a result of these arrangements the restocking of the mobile unit is facilitated by the return of the mobile unit to the fixed unit and complete replacement of the tank.

In embodiments, the fixed supply unit comprises an acid bath microwave heating unit.

As a result of these arrangements the electrical consumption of the mobile unit is reduced.

In embodiments, the system, object of the present invention comprises a means of extraction of magnesium from a liquid fraction formed from the used bath acid.

As a result of these arrangements the value of the magnesium is recovered.

In embodiments, the bath acid is comprised of sulfuric acid, the system object of the present invention comprising a means of production of anhydrite from solid products issued from the reaction taking place in the hot acid bath.

In embodiments, the system, object of the present invention, comprises a means of production of materials presenting mesopores of which at least 10% present a diameter inferior to 20 Å.

As a result of each of these arrangements the solid fraction from the reaction in the bath acid provides a valuable material.

In embodiments, the bath acid is comprised of sulfuric acid which in turn comprises a means of production of magnesium sulfate from the solid products from the reaction taking place in the hot acid bath.

In this way recovery is achieved of valuable magnesium contained in the liquid fraction from the acid attack, obtained after treatment of the asbestos waste. In effect the liquid part contains the quasi-totality of the (dissolved) magnesium which constituted the asbestos.

Having the lowest density of all the metal elements, magnesium possesses characteristics very similar to those of aluminum but it is 34% lighter than aluminum and 70% lighter than steel. It is therefore considered as the ideal solution in response to requirements for lightness by the new transport industry standards.

In addition to its excellent properties in terms of density/resistance to traction, magnesium offers other interesting characteristics:

Taking account of its crystalline structure, magnesium possesses an excellent capacity in reduced vibration transmission (magnesium is 16 times more resistant to impact than aluminum).

Magnesium possesses excellent properties in electromagnetic protection. A screen of one millimeter thickness reduces electromagnetic transmission by 80%. Also, magnesium has a less aggressive effect than aluminum on steel molds, thus permitting to prolong the useful life of tools.

In embodiments, the system, object of the present invention comprises a means of fabrication of zeolites from solid fraction issued from the used bath acid.

During the acid attack, the acid reacts with hydroxylic compounds (OH)— and brucite fibers $Mg(OH)_2$ which results in their disappearance (dissolution of Mg) and therefore the amorphization of asbestos waste which transforms into an inert solid made up of amorphous silica.

The inert solid matter obtained is beneficially exploited in the fabrication of functional material such as zeolites.

Zeolite is a natural mineral (volcanic rock) belonging to the hydrated aluminosilicates group. The zeolites are crystallized microporous solids of which the tridimensional mineral structure is made up of canals and cavities (pores) in communication with the outside environment and of which the diameter is inferior to 2 nm (ie; $2.10^{-9}$ m).

Globally these features confer on the zeolites very interesting properties in different industrial domains such as adsorption, catalysis or ionic exchange.

According to a second aspect, the present invention relates to a process for asbestos neutralization, that comprises:
- a step for the installation on the asbestos removal site of a mobile neutralization unit comprising:
  - an asbestos waste sorting module
  - an asbestos grinder
  - a hot acid bath to render the asbestos inert;
- a step for the sorting of asbestos waste in the sorting module of the mobile neutralization unit;
- a step for the grinding of asbestos by the grinder of the mobile neutralization unit;
- a step for the attack on the asbestos with the hot acid from the hot acid bath of the mobile neutralization unit, and
- a step for the extraction of magnesium from the liquid fraction issued from the attack on the asbestos with the hot acid and/or the fabrication of zeolites from the solid fraction from the attack on the asbestos with hot acid.

The advantages, objectives and particular features of this process being similar to those of the system object of this invention, it is not necessary to list them here.

In embodiments, during the step for the sorting of the asbestos waste, the fibrocement waste is also sorted.

As a result of these arrangements, material presenting appreciable mechanical qualities is obtained.

According to a third aspect, the present invention envisages a device for neutralizing asbestos waste, which comprises:
- an acid tank,
- a vat containing a diluted acid solution, in which waste containing asbestos is dipped, with this solution neutralizing the asbestos waste,
- a filtration unit to separate, at the end of the neutralization reaction, the solid inert waste from the liquid phase of the acid solution,
- a regeneration unit for the attacking acid solution, which adjusts the hydrogen potential of the extracted liquid phase by adding concentrated acid contained in the acid reservoir, and
- means for transferring the regenerated solution into the vat.

Thanks to these provisions, the neutralization performance of the acid contained in the vat is maintained for each of the successive waste neutralization cycles in this vat. In addition, keeping the vat containing the acid solution at a preset temperature is simplified and requires a heat input corresponding to the additional heating of the regenerated acid solution to reach the working temperature. Lastly, the inert solids from the neutralized waste are recovered and recycled for use in manufacturing.

In some embodiments, the device that is the subject of the present invention comprises means for determining a type and/or content of asbestos in the waste prior to immersion in the vat, with the regeneration unit adjusting the hydrogen potential of the regenerated acid solution as a function of the type and/or content of asbestos.

These embodiments make it possible to adjust the quantity of acid required to be added to the acid solution to be regenerated.

In some embodiments, the device that is the subject of the present invention comprises means for the treatment of neutralized waste transformed into inert solids as a function of the asbestos content determined.

The advantage of these embodiments is that they use the properties of the neutralized waste in optimum fashion, depending on the type and content of asbestos in the waste, to create new raw materials, which can be used in manufacturing, eg cement additives.

In some embodiments, the device that is the subject of the present invention comprises a unit for grinding asbestos waste before immersion in the acid vat, which reduces the size of the waste to dimensions ranging from one-tenth of a millimeter to one millimeter.

These embodiments make it possible to speed up the neutralization of the asbestos waste and therefore to optimize the device that is this subject of the present invention.

In some embodiments, the device that is the subject of the present invention comprises an attenuation sensor for the asbestos waste neutralization acid solution, and a selective precipitation unit for the acid solution's liquid phase, depending on the degree of attenuation it senses, powered by the regeneration unit.

Thanks to these provisions, once the regenerated acid neutralization solution has reached its performance threshold, this solution is processed and brought to neutral pH, then the principal elements it contains are extracted for recycling. Consequently, the risks of corrosion and of danger to the operator are removed.

In some embodiments, the attenuation sensor is a probe in the form of an ion-selective electrode (ionic activity sensor).

These embodiments have the advantage of being able to monitor the progress of the reaction in the vat in real time.

In some embodiments, the filtration unit comprises a filter with a porosity lower than 0.5 µm.

In some embodiments, the device that is the subject of the present invention comprises an exterior closed loop connected to the vat and having means for cooling the vapors on exit from the vat.

These embodiments make it possible to liquefy the vapors released in the vat in order to reduce the discharge of gas effluent. The volume of acid is preserved.

In some embodiments, the device that is the subject of the present invention comprises means for humidifying the waste before it is immersed in the vat of diluted acid.

Such provisions make it possible to prevent the asbestos fibers from becoming volatile.

In some embodiments, the device that is the subject of the present invention comprises means for desalinating water before diluting the acid in the vat with the desalinated water.

These embodiments make it possible, in the case of mobile devices, to avoid having a limited stock of desalinated water.

In some embodiments, the device that is the subject of the present invention comprises a washing and drying unit for the neutralized wasted transformed into inert solids.

Thanks to these provisions, the inert solids no longer contain any traces of acid and are therefore no danger to a user.

In some embodiments, the device that is the subject of the present invention comprises means for recovering the washing water for the preparation of the acid solution.

These embodiments make it possible to save the water used in the device and to reuse the water used for washing.

In some embodiments, the vat comprises at least one agitation system.

The advantage of these embodiments is that they homogenize the reactive mixture in the vat.

In some embodiments, the device that is the subject of the present invention comprises means for heating the acid solution by microwaves.

These embodiments make it possible to heat the acid solution quickly and at a low cost.

In some embodiments, the device that is the subject of the present invention comprises a confined asbestos waste sorting unit comprising:
  a window equipped with glove boxes, and
  a conveyor to transport the asbestos waste behind the window.

These embodiments make it possible to sort the asbestos waste without requiring personal protection equipment for the operators. These embodiments allow savings to be made on the budget allocated for personnel protection.

According to a fourth aspect, the present invention envisages a method for neutralizing the asbestos waste, comprising the following steps:
  dilution of acid and filling of a vat with a diluted acid solution that neutralizes the asbestos waste,
  immersion of waste containing asbestos,
  neutralization of the asbestos waste in the vat,
  filtration to separate the liquid phase after the asbestos waste has been neutralized,
  regeneration of the acid solution, which adjusts the hydrogen potential of the extracted liquid phase by adding acid contained in the acid reservoir, and
  transferring the regenerated acid solution into the vat.

As the particular features, advantages and aims of the method that is the subject of the present invention are similar to those of the device that is the subject of the present invention, they are not repeated here.

In some embodiments, the method that is the subject of the present invention comprises a step of measuring the attenuation of the acid solution, wherein the acid solution is regenerated as long as the measured attenuation is below a predefined limit value and, when the measured attenuation is above the predefined limit value, a step of extracting the by-products of the liquid phase by selective precipitation of the acid solution.

BRIEF DESCRIPTION OF THE DIAGRAMS

Figure 2:
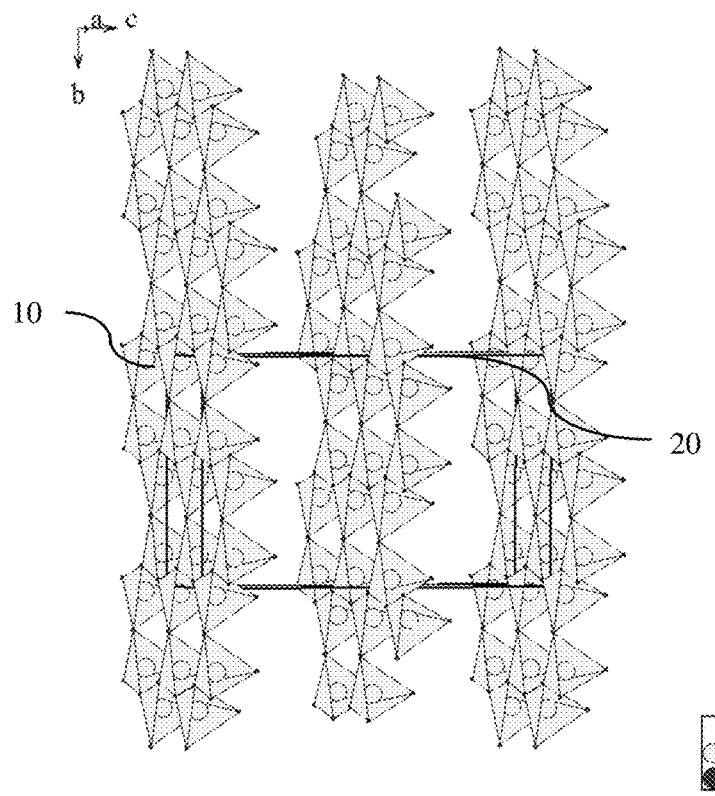
Figure 3:
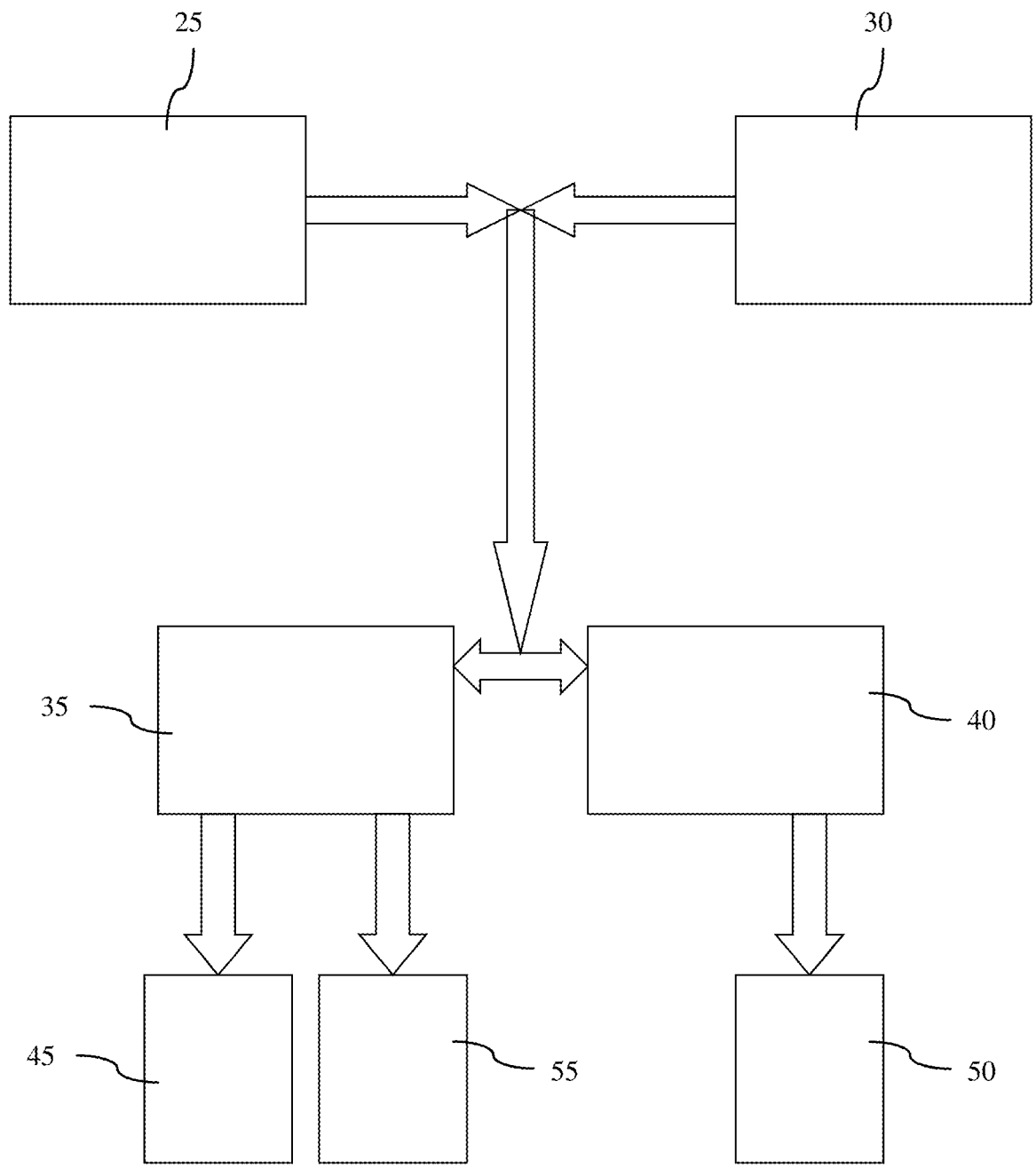
Figure 4:
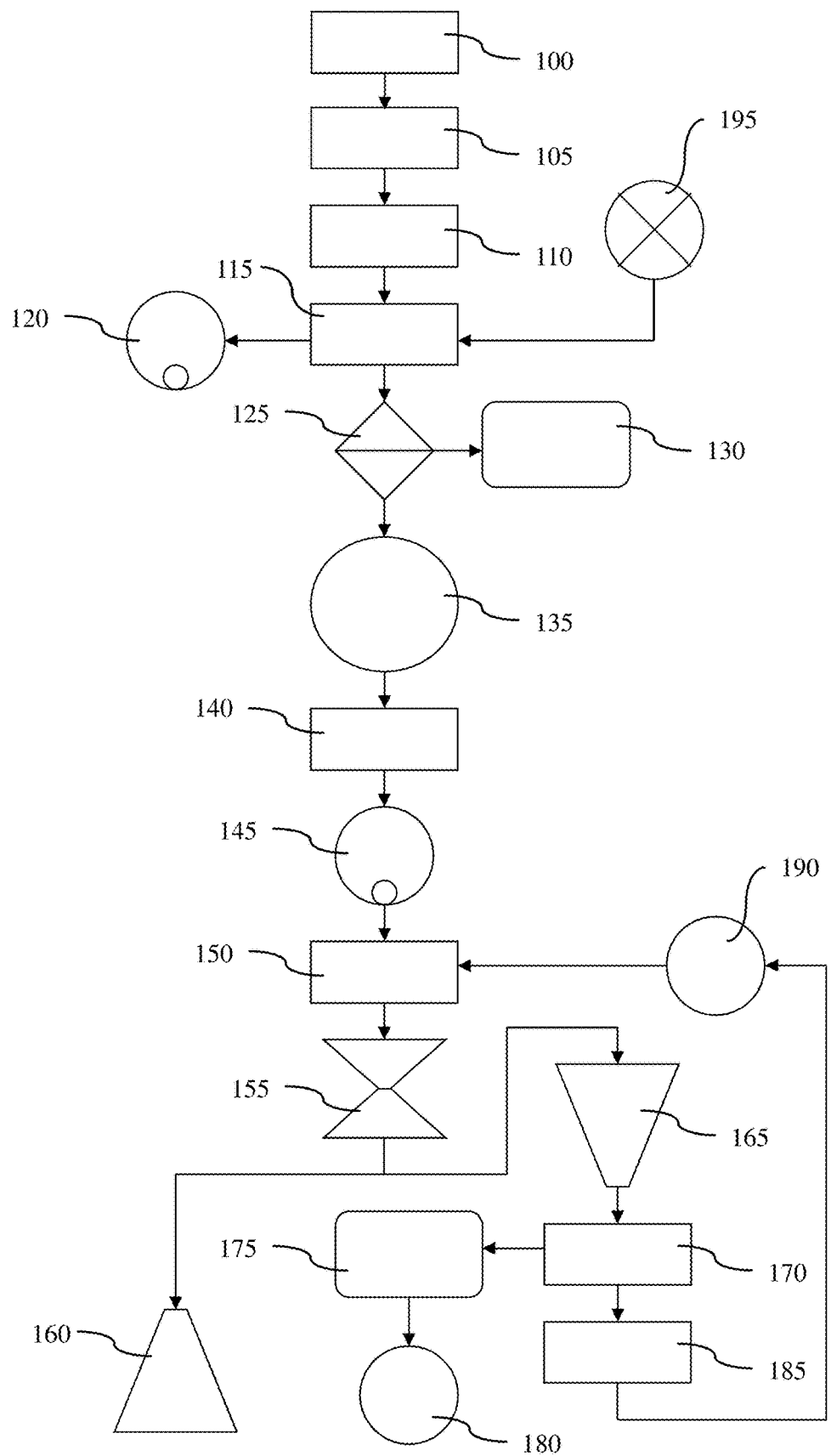
Figure 5:
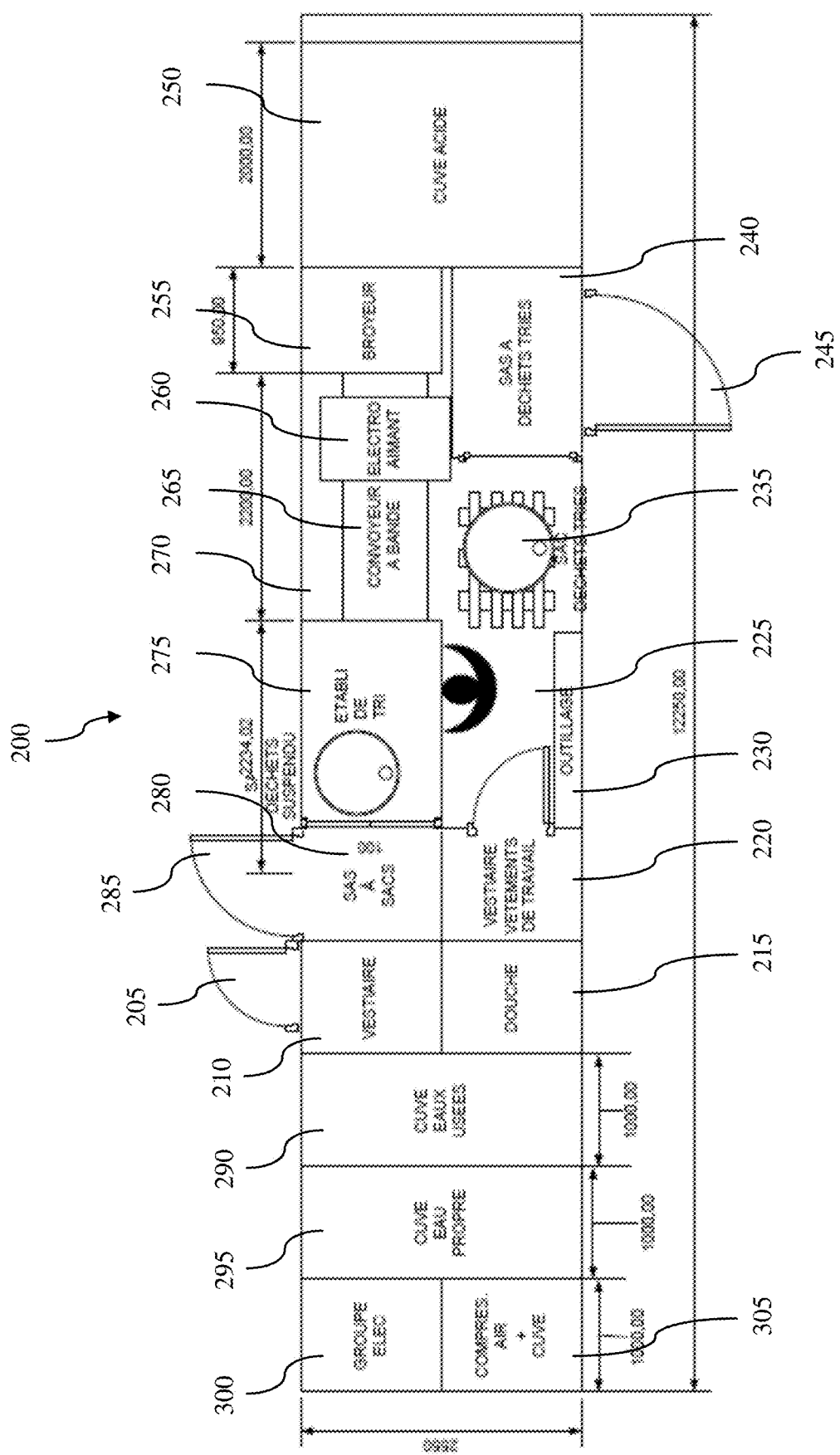
Figure 6:
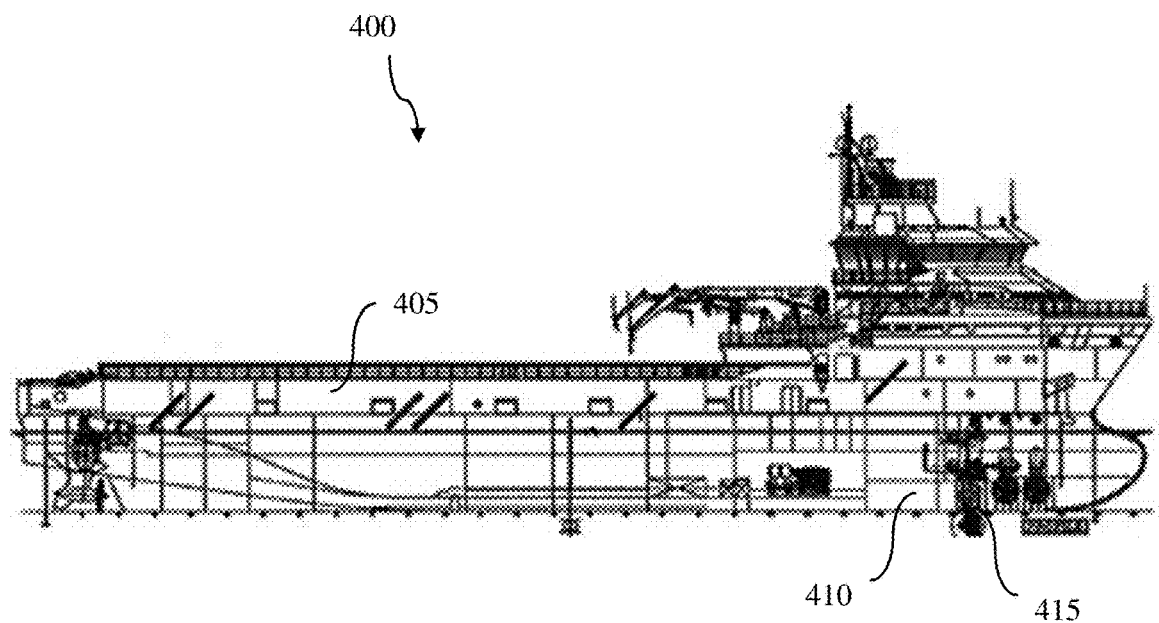
Figure 7:
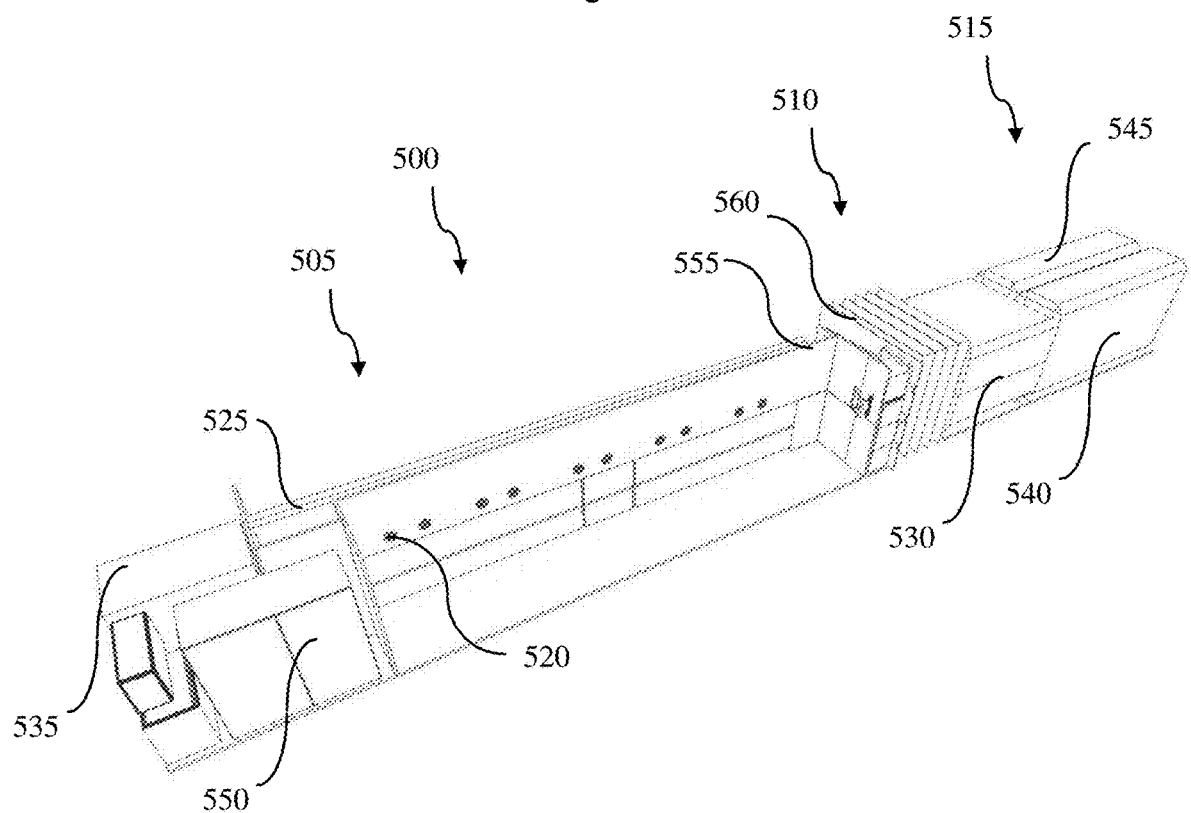
Figure 8:
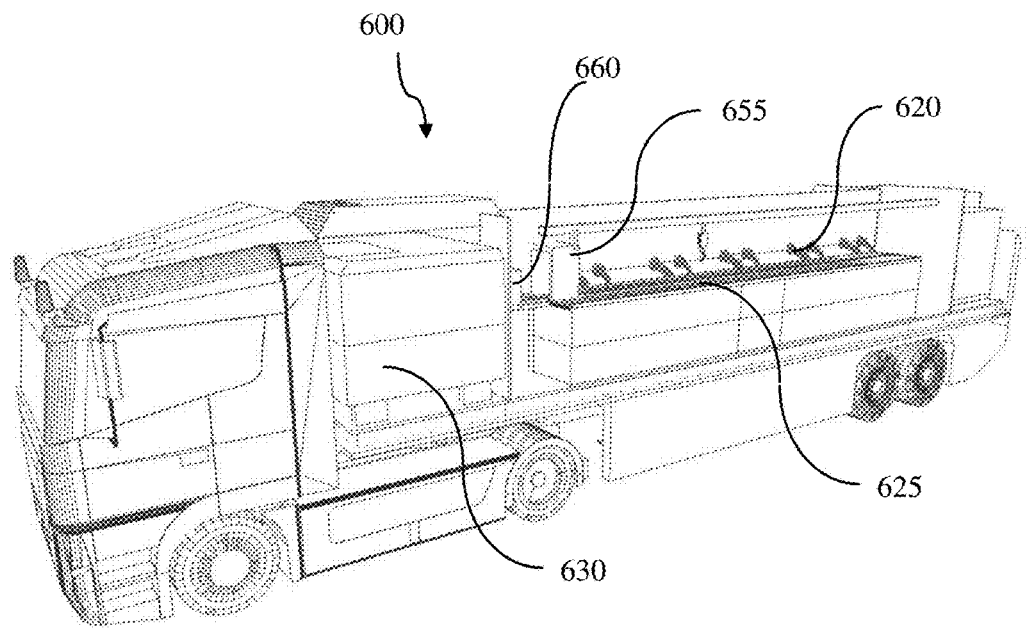
Figure 9:
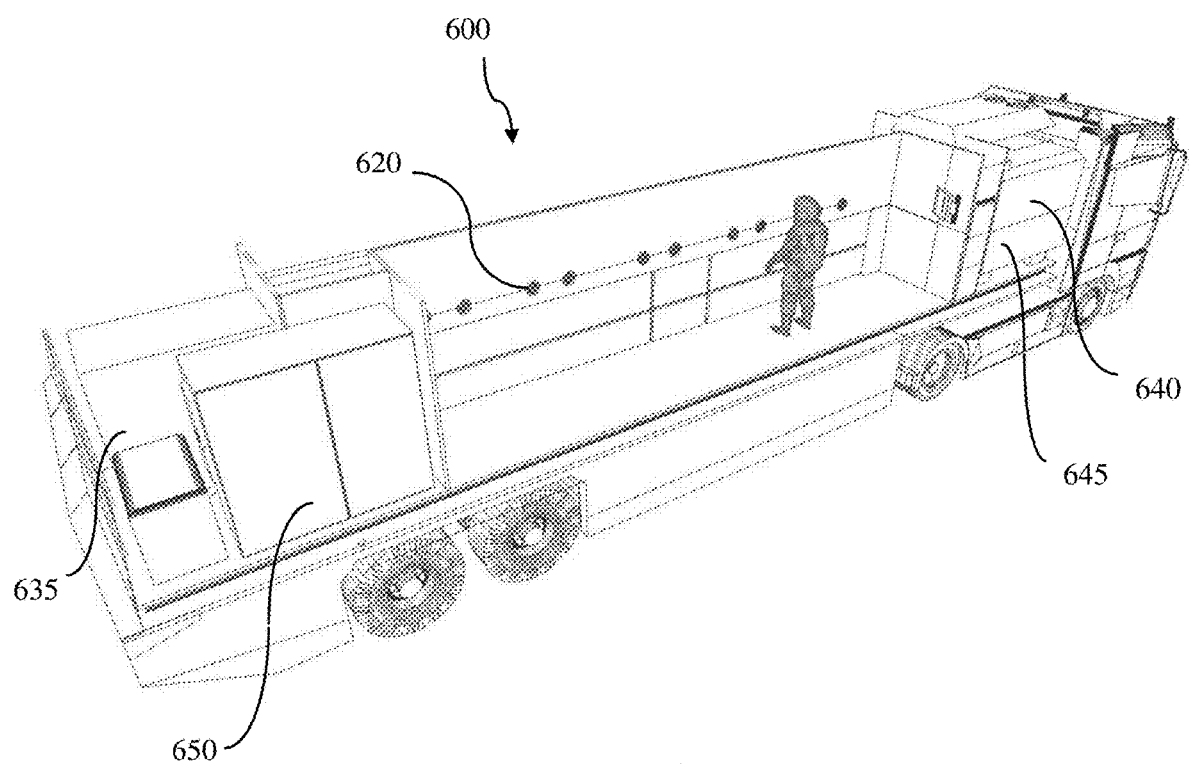
Figure 10:
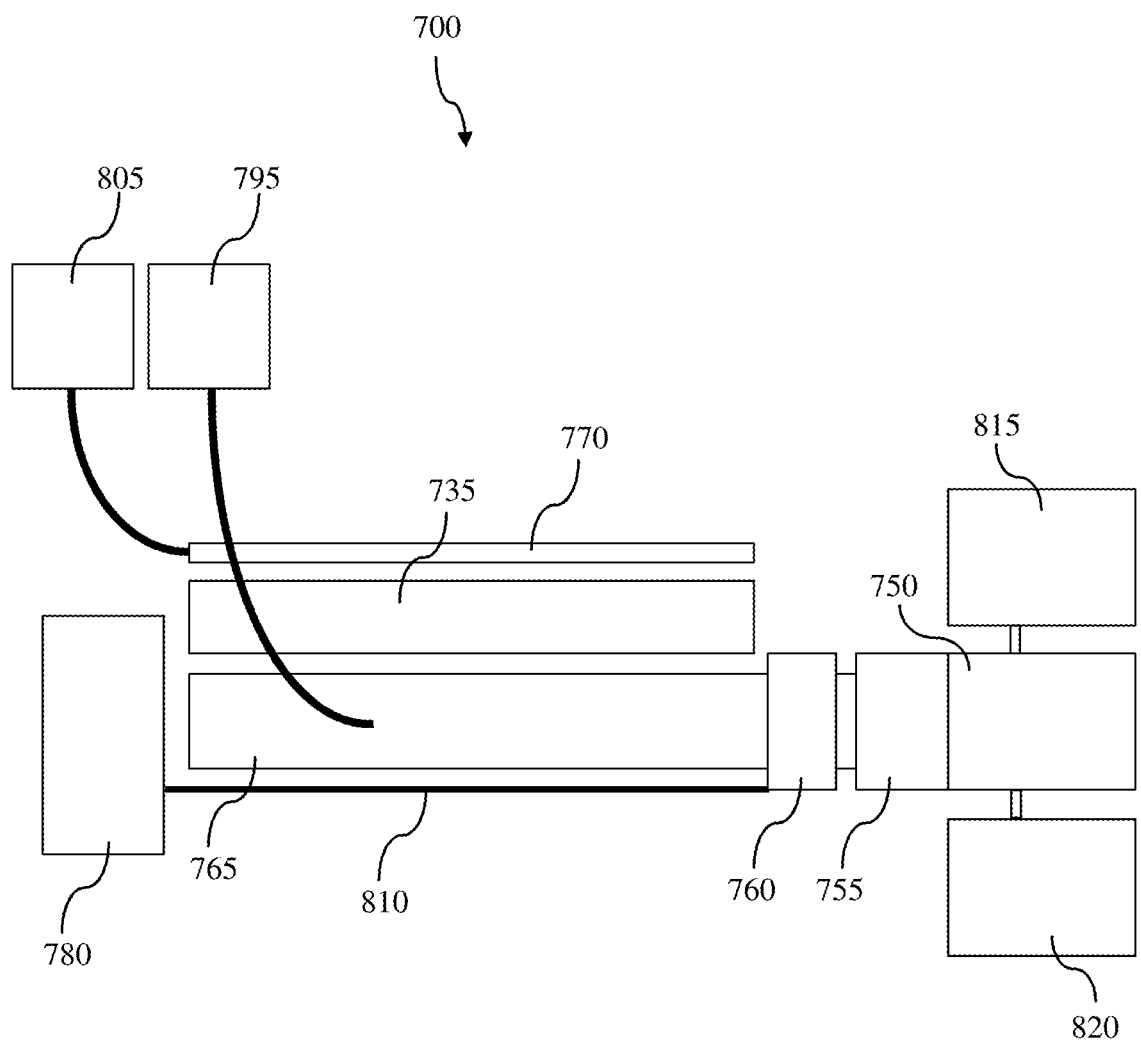
Figure 11:
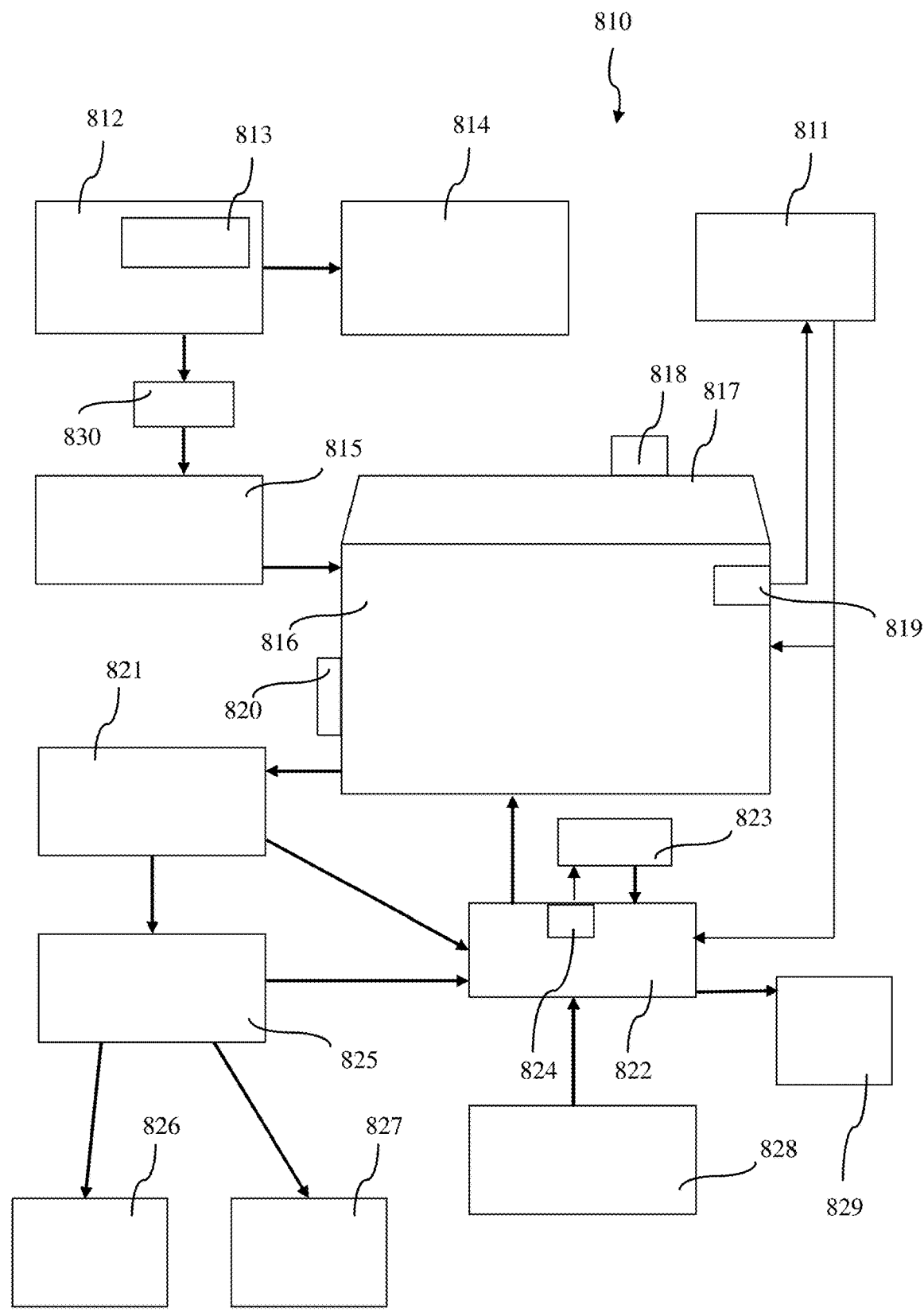
Figure 12:
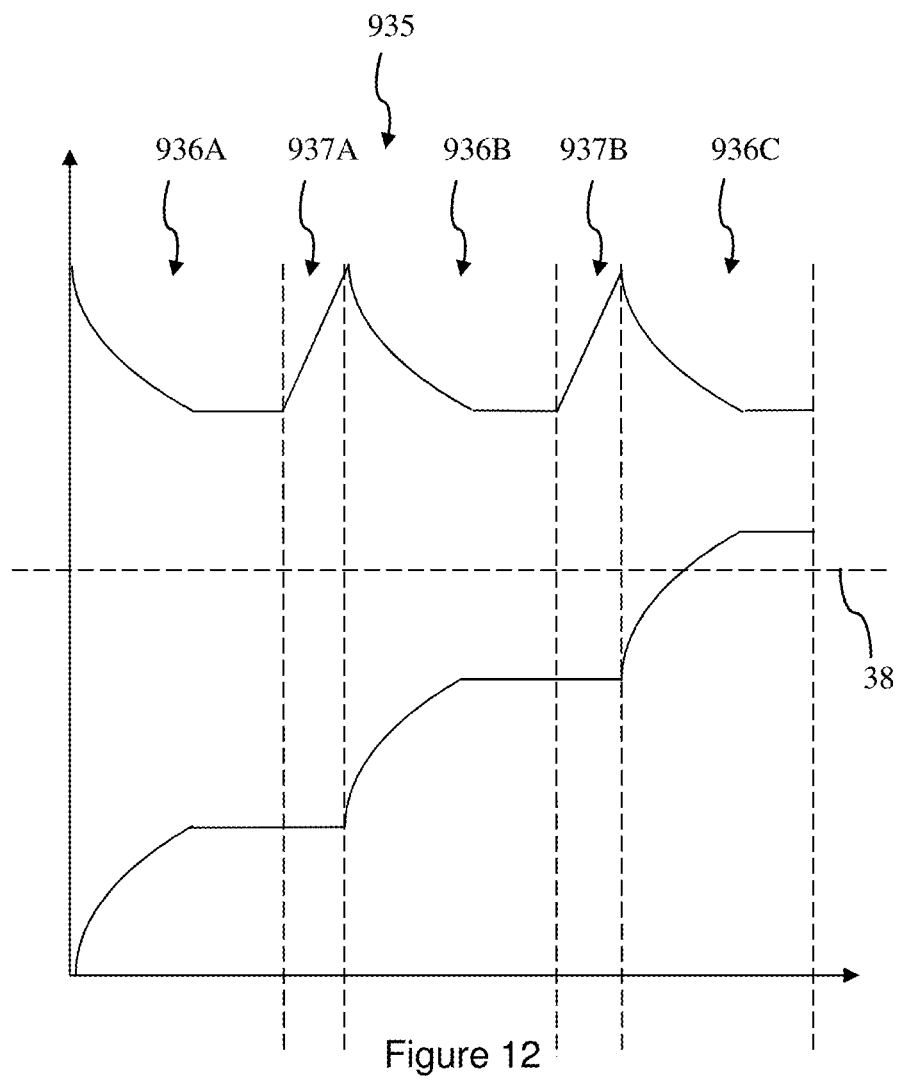

Other advantages, objectives and characteristics of the present invention will become apparent from the description which follows, given with the intention to be explicative and not at all limitative, with regard to the attached diagrams in which:

FIG. 1 represents schematically an asbestos structure before treatment,

FIG. 2 represents schematically the asbestos structure illustrated in FIG. 1 after treatment by acid attack, FIG. 3 represents, in the form of a functional diagram, the process being the object of the present invention, FIG. 4 represents, in the form of an operational plan, a first embodiment of an asbestos treatment unit, FIG. 5 represents, as viewed from above, a first embodiment of a mobile neutralization unit, FIG. 6 represents, as viewed laterally, a boat equipped with a mobile neutralization unit, object of the present invention, FIG. 7 is a view in 3-dimensional effect, of a second embodiment of a mobile neutralization unit, FIG. 8 is a first view in 3-dimensional effect of a truck equipped with a third embodiment of a mobile asbestos neutralization unit, FIG. 9 is a second view in 3-dimensional effect of the truck illustrated in FIG. 8, FIG. 10 represents, in a top schematic view, a particular embodiment of a fixed asbestos waste neutralization and recycling unit, FIG. 11 represents, schematically, a particular embodiment of a device that is the subject of the present invention and FIG. 12 represents, schematically, a cycle of an acid solution of a device that is the subject of the present invention.

DESCRIPTION OF EXAMPLES OF THE EMBODIMENTS OF THE INVENTION

It is to be noted that for the present the diagrams are not drawn to scale.

In the following description, bath and vat can be used interchangeably and reservoir and tank can be used interchangeably.

The present invention concerns a neutralization system, that comprises a mobile neutralization unit and in the embodiments, a supply unit, fixed or mobile, of the mobile neutralization unit and/or a treatment unit for the products issued from the mobile neutralization unit.

The mobile neutralization unit uses an approach comprising amorphization of the asbestos, (regardless of the type, amphibole or serpentine) in a reduced time (less than 24 hours in every case) by immersing the asbestos in an acid bath at temperatures inferior to 104° C., preferably inferior to 100° C., preferably superior to 70° C. and, still more preferred if superior to 80° C.

Each mobile neutralization unit is installed on the asbestos removal site or in proximity to the site, notably where it concerns a ship for asbestos removal, in order to:
  sort the asbestos waste
  grind the waste and
  render the asbestos inert in a hot acid bath.

The acid used should by preference be sulfuric acid, which permits a better return value for the products issued from the reaction.

From the crystallographic point of view, as illustrated in FIG. 1 the chrysotile is presented in the form of stacked layers of silicates 10 (tridymite structure) connected by liaisons 20, and layers of brucite $Mg(OH)_2$ 15.

During the acid attack, the acid reacts with the hydroxylic compounds (OH)— layers of brucite $Mg(OH)_2$ 15 which lead to their disappearance (dissolution of Mg) and therefore the amorphization of the asbestos waste which transforms into an inert solid constituted from amorphous silica. As illustrated in FIG. 2 the residual solid fraction comprises only the amorphous silica 10 and the liaisons 20.

The transport and the stocking of dangerous material like asbestos are subject to strict and complex regulations which render the whole operation very costly. The new mobile approach allows therefore not only to introduce a solution for the amorphization of the asbestos but also to reduce the costs (no further transport of asbestos as the asbestos has ceased to exist, and similarly no need for its storage either.)

The whole is constituted by a mobile neutralization unit and in embodiments:
- A trailer, preferably of about twelve meters in length, in compliance with the regulations in force for non-exceptional convoys, which would support the mobile neutralization unit during its transport and equally during its operations,
- A truck ensuring the same functions,
- A boat, for transport and/or for support during the functioning of the mobile unit or
- A fixed site-based support.

The mobile neutralization unit can conveniently be housed in a standard 40-foot container. This would allow the loading of the mobile neutralization unit onto a trailer, onto a train, a ship, or even onto a plane.

As illustrated in FIG. 3, the process object of the present invention comprises to make a reaction of the acid 25 with the asbestos waste 30, to produce an inert solid phase 35 composed of silica and a liquid phase comprising magnesium 40, for example magnesium salts. According to embodiments, the solid phase 35 is treated to supply zeolites 45 and/or anhydrites 55 and/or the liquid phase 40 is treated to extract magnesium or a magnesium compound 50.

As illustrated in FIG. 4, the process comprises:
- A step 100 for the installation on or in proximity to the asbestos removal site, of a mobile neutralization unit, (for example as described in the other diagrams),
- A step for the arrival of the waste 105,
- A step for the weighing of the waste 110,
- A step 115 for the opening and emptying of the waste sacks and the addition of water from a reservoir 195 to reduce the risk of airborne pollution,
- A step for the stocking of polluted sacks 120,
- A step for sorting by visual means and with aid of a metal detector 125,
- A step for the stocking of sterile waste or comprising metal 130,
- A step for the stocking of sorted asbestos 135,
- A step for the grinding of asbestos 140,
- A step 145 for the stocking of ground down asbestos,
- A step 150 for the reaction, in a bath, of ground asbestos and acid supplied from a reservoir 190; in this way the asbestos waste is chemically, economically, and easily neutralized, particularly in the case of attacking the waste with inexpensive sulfuric acid $H_2SO_4$ (for example of 96% purity).
- A step for filtration from the used bath 155,
- A step 160 for extraction of solid fraction from the used bath, with eventual valorization in the form of zeolites,
- A step 165 for extraction of liquid fraction from the used bath.
- A step 170 for precipitation of magnesium compounds and eventually for acid neutralization,
- A step for concentration of magnesium compounds 175,
- A step for stocking magnesium compounds 180 and
- A step for recycling of the used bath 185 to supply the acid reservoir 190.

It is to be noted that the valorization of the solid phase is not described in FIG. 4.

The mobile neutralization unit 200 illustrated in FIG. 5 comprises:
- An operators' entry door 205 towards a cloakroom 210,
- A shower 215,
- A cloakroom for working attire 220,
- A module, or workshop, for sorting 225,
- A detachable acid bath tank 250,
- A chamber for introduction of asbestos waste sacks 280 equipped with an exterior door 285,
- A tank for used water 290,
- A tank for fresh water 295,
- A generator 300 and
- An air compressor 305 equipped with a compressed air reservoir.

The cloakroom 210, the shower 215 and the cloakroom 220 constitute jointly a decontamination chamber for the operator;

The module 225 for the sorting of waste comprises:
- A workbench 275,
- A conveyor belt 265,
- A metal detection unit 260,
- The grinder 255,
- A tool cupboard 230,
- A receptacle for sorted non-asbestos waste 235 (after sorting) and
- An evacuation chamber 240 for non-asbestos waste, and equipped with an exterior door 245.

The module 225, or workshop, for sorting, is equipped with a circuit 270 for air circulation keeping the module 225 in depression, thus avoiding the airborne diffusion of asbestos particles outside of the mobile neutralization unit.

A confined atmosphere is therefore retained in the mobile neutralization unit 200.

The whole of the asbestos-based waste is treated by moisture (addition of fresh water—not represented) in order to limit the diffusion of dust in suspension and also to fluidify the circulation of the waste.

After the grinding, the asbestos-based waste is introduced by way of a sealed circuit (not represented) into an insulated tank of hot acid for destruction. This tank is detachable allowing its replacement as and when required. It is the same procedure for the tanks of fresh and used water.

The mobile neutralization unit 200 is also equipped with a technical bay (not represented) allowing not only to operate the whole of the components in conditions of safety compliant with the regulations in force but also to monitor/verify/operate/register the whole of these parameters in order to be able to respond at any time to a sanitary inspection.

As a complement to the mobile units the neutralization system could comprise at least one fixed unit, or factory (not represented), for supply in hot acid tanks. The bringing of a mobile neutralization unit to the fixed unit is achieved by a series of simple actions:
- dismounting of the tank containing the waste.
- loading of a 'new' tank (preheated acid),
- emptying of the used water tank or its exchange with an empty tank,
- refilling of the fresh water tank or its exchange and
- connection to the operating system of the mobile neutralization unit for storage of functional data of the mobile neutralization unit onto a secured and fixed database integral to the factory.

The fixed unit to supply a mobile neutralization unit comprises:
- a means of dismounting a tank from the mobile neutralization unit containing the used acid bath,
- a means of loading a tank of pre-heated acid into the mobile neutralization unit,
- a means of emptying a tank of used water or the exchange of a tank of used water with an empty tank,
- a means of filling a tank with fresh water or its exchange with a tank full of fresh water and a means of transfer of the functional data of the mobile neutralization unit from said unit to a secured database in the fixed unit.

Preferably, the fixed unit comprises a means of extraction of magnesium from the liquid fraction issued from the used acid bath.

Preferably, the fixed unit comprises also a means of fabrication of zeolites from the solid fraction issued from the used acid bath.

In embodiments, the fixed unit comprises a microwave heater for the acid bath, the tank being lagged with insulation to conserve the heat.

In other embodiments, the mobile units remain deployed on the site for the duration of the asbestos removal works and are simply restocked with tanks of fresh water and 'new' acid, and the empty tanks are recovered and transported to the treatment plant on 'standard' trucks.

The vehicle (not represented) to supply a mobile neutralization unit comprises:
  a means to dismount a tank from the mobile neutralization unit containing the used acid bath,
  a means of loading a tank of pre-heated acid into the mobile neutralization unit,
  a means of emptying a tank of used water or its exchange with an empty tank,
  a means of filling a tank with fresh water or its exchange with a full tank of fresh water.

The mobile neutralization unit and the supply vehicle resemble from the exterior known refrigerated trailer trucks (curtains closed), trucks or transport boats.

Illustrated in FIG. 6, is a boat based factory comprising a transport boat 400 («supply boat») transporting at least one mobile neutralization unit 405. The boat 400 comprises a motor 415 and a generator 410 mu by the motor 415. The electrical supply for each mobile neutralization unit 405 is made by the generator 410.

It is noted that the boat 400 can carry at the same time at least one mobile neutralization unit 405, the acid replacement tank of the reservoirs of fresh and used water.

In the embodiments illustrated in FIGS. 7 to 9, the operators work in front of a window wearing standard work attire, it not being necessary to wear special protective 'anti-asbestos' clothing.

In FIG. 7 a mobile asbestos neutralization unit 500 comprises:
  A sorting tub 505, for example able to be housed in a standard 40-foot container.
  An articulation 510, for example with bellows, and
  A treatment tub 515, for example housed in a standard 20-foot container.

The glove box positions 520 separated by a window from the conveyor 525 simplify considerably the operations since the operators do not have to pass by the sterile zone (dress, shower, undress . . . ).

The mobile neutralization unit 500 comprises:
  A module, or workshop for sorting from the conveyor 525,
  A detachable acid bath tank 530,
  A reception chamber for the arrival of sacks of asbestos-based waste 535 equipped with an exterior door (not represented),
  A tank of used water 540,
  A tank of fresh water 545,
  An air compressor 550 equipped with a compressed air reservoir,
  A metal detector unit 555,
  The grinder 560,
  A receptacle for the sorted non-asbestos waste (not represented) and
  An evacuation chamber for non-asbestos waste (not represented) equipped with an exterior door.

It is emphasized here that a glove box is a sealed apparatus permitting manipulations in a particular environment. The gloves, for hands and wrists only, or going up to the elbows or shoulders even, fixed to a sealed screen, allow access to the interior without infringing the confinement. The operator puts his hands in the gloves and is able to observe his manipulations through the transparent screen.

In this way, the mobile neutralization unit avoids the presence of sorting personnel inside the confined zone. The sorting personnel are not therefore subject to the legal constraints concerning work in a dangerous environment and the decontamination chamber can be reduced or even suppressed completely.

In FIGS. 8 and 9, a mobile asbestos neutralization unit 600 comprises glove box positions 620 separated by a window from a conveyor 625, simplifying considerably the operations since the operators do not have to pass through the sterile zone (otherwise requiring dressing, shower, undressing . . . ).

The mobile neutralization unit 600 comprises:
  A module, or workshop, for sorting from the conveyor 625,
  A detachable tank for acid bath 630,
  A reception chamber 635 for introduction of sacks of asbestos-based waste, and equipped with an exterior door (not represented),
  A tank for used water 640,
  A tank for fresh water 645,
  An air compressor 650 equipped with a compressed air reservoir,
  A metal detector unit 655,
  The grinder 660,
  A receptacle for non-asbestos sorted waste (not represented) and
  An evacuation chamber for non-asbestos waste (not represented) equipped with an exterior door.

The fact to use sulfuric acid instead of hydrochloric acid has two advantages:
  it is actually the least expensive acid and is produced industrially on a large scale (no risk of a lack of suppliers)
  the liquid phase obtained after acid attack is magnesium sulfate, which is very useful in numerous industries, for example in the composition of agricultural fertilizer.

There follows a description of the valorization possibilities offered by the inert solid obtained after hot acid attack.

Following the hot acid treatment, the inert solid obtained is susceptible for exploitation in different ways of valorization according to the nature of the initial waste from which it is issued.

In effect, the material containing loose asbestos, such as plaited asbestos cords, have a very high rate of asbestos content and permit, (after hot acid attack) to obtain mainly the silica ($SiO_2$) in large quantity and thus promoting the fabrication of zeolites.

The material containing asbestos related substances (10 à 20% asbestos), such as corrugated sheets of fibrocement, have a chemical composition in calcium oxide (lime (CaO) and in silica ($SiO_2$) of 40% and 19% respectively). This composition is very close to that of Portland cement (registered trademark). The attack on these materials by hot sulfuric acid permits to mostly obtain calcium sulfate $CaSO_4$ also called Anhydrite. This compound forms in dominant proportion in mixture with the silica. Anhydrite is an essential additive in the fabrication chain for cement.

It is important to emphasize here the role of sulfuric acid as the determining factor for obtaining Anhydrite as the use of other acids such as hydrochloric acid do not achieve the same result.

In certain cases, the acid attack on the starting waste leads to the formation of an inert solid comprising mesopores (distribution of the pore diameters: 75% macro and mesopores of diameter superior to 20 Å and 25% micro pores of diameter inferior to 20 Å), and generate an increase in area of its specific surface BET. More generally, the present invention permits the production of products presenting mesopores of which at least 10% present a diameter inferior to 20 Å.

These characteristics (macro structure and mesoporous associated to the fibrous morphology) give to the inert solid remarkable mechanical properties, for example permitting the absorption and/or the blocking of a shock wave, for example energetic materials (explosives fabrication) and acoustic insulation by sound absorption barriers.

Other applications are envisaged for the intermediate inert solid, for example in the domain of water filtration, applications in which the granular distribution would be able to provide good bacterial support.

FIG. 10 shows a fixed asbestos waste neutralization unit 700. This fixed unit 700 comprises:
an acid solution vat 750,
a chamber for inserting bags of waste containing asbestos 780,
a vat for fresh water 795, and
an air compressor 805 equipped with a compressed air reservoir.
A sorting module for the waste comprises:
a belt conveyor 765,
a metal detection unit 760,
a grinding unit 755,
a receptacle for non-reusable sorted waste 735 containing asbestos or not.

The module for sorting is equipped with a circuit 770 for air circulation keeping the sorting module at negative pressure, to avoid the airborne diffusion of asbestos fibers outside the mobile neutralization unit. The mobile neutralization unit 700 is thereby confined.

All the asbestos waste is humidified by adding fresh water from the fresh water vat 795 in order to limit the diffusion of dust in suspension and also to fluidify the circulation of the waste.

After grinding, the asbestos waste is transferred through a sealed circuit (eg a sealed suction pump, not shown) to the insulated vat 750 of hot diluted acid to be destroyed. This vat is removable, allowing it to be replaced as and when required. The same applies to the vats for fresh and waste water.

The mobile neutralization unit 700 is also equipped with a technical bay (not represented) making it possible not only to operate the whole of the components in conditions of safety compliant with the regulations in force but also to monitor/verify/operate/register all these operating parameter values in order to be able to respond at any time to a sanitary inspection.

In the embodiment shown in FIG. 10, the vat 750 is connected to two filtration and regeneration units, 815 and 820. After a cycle N of neutralization with acid in the vat 750 of a batch of waste containing asbestos, the reactive mixture comprising the solid and the liquid is transferred to one of the two filtration and regeneration units, for example unit 815. Once the vat 750 is empty, a solution of fresh or regenerated acid coming from the filtration and regeneration unit 820 is introduced into the vat 750 to prepare for starting a new neutralization cycle N+1. The asbestos waste coming from the grinding station is then transferred into the vat 750 containing the fresh acid solution, which is waiting, and a new neutralization cycle N+1 begins. While the neutralization cycle N+1 is running, the filtration and regeneration unit 815 performs the filtration of the acid solution coming from the previous neutralization cycle (cycle N), which it has received, and the regeneration of this acid solution for a new neutralization cycle N+2. The roles of the two filtration and regeneration units are then inverted.

In some variants, several vats 750 are used and swapped after the end of each step of neutralization of the asbestos waste by the diluted acid solution.

Continuity of production is thereby achieved.

FIG. 11, which is not to scale, shows a schematic view of an embodiment of the asbestos waste neutralization device 810 that is the subject of the present invention. In FIG. 11, the thicker arrows represent matter flows and the thinner arrows represent data flows.

The device 810 comprises an acid tank 823. Preferably, the acid contained in the tank is sulfuric acid, chemical formula $H_2SO_4$.

The device 810 comprises a vat or reactor 816 containing a diluted acid solution, into which the waste containing asbestos is dipped, neutralizing the asbestos. Preferably, the diluted acid solution is a solution of sulfuric acid diluted with water.

The vat 816 comprises means 820 for heating the acid solution. Preferably, the means 820 for heating the acid solution are heating means using electrical of microwave energy. In some embodiments, the heating means are positioned on acid and water supply conduits of the vat 816. In some embodiments, the heating means 820 comprise heating by electrical energy, by microwave or by a furnace with coils for circulating the heat-transfer liquid surrounding the vat 816.

The acid solution in the vat 816 is heated to a temperature close to the boiling temperature of the acid solution. Preferably, the temperature of the acid solution in the vat 816 is below 104° C. In some embodiments, the temperature of the acid solution in the vat 816 is between 80° C. and 100° C.

The vat 816 has adiabatic walls, thus slowing down heat loss. There are cooling means 817 above the vat 816. Since the temperature of the acid solution contained in the vat is close to its boiling temperature, the cooling means 817 make it possible to condense the evaporated acid. Once liquefied, the acid vapors return into the vat 816. In this way, one achieves a conservation of the acid solution's mass and a limitation of the discharge of noxious fumes.

Preferably, the cooling means 817 comprise a cooling column fitted with metal coils traversed by a cold heat exchange fluid, eg water. The cooling means 817 end in a flue 818 designed to keep the pressure of the atmosphere inside the vat 16 equal to the atmospheric pressure. The flue 818 is fitted with a filter, eg a charcoal filter, to capture any gaseous discharge.

Preferably, the vat 816 comprises at least one agitation system. The agitation system may be a device comprising a rod fitted with mobile blades centered in the fixed vat 816, for example. Or a device comprising a rod fitted with fixed blades centered in the mobile vat 816.

The device 810 comprises a filtration unit 821 to separate, firstly, the liquid phase of the acid solution after the neutralization of the asbestos waste, and, secondly, the solid neutralized waste, ie the inert solids resulting from the neutralization.

The filtration unit 821 is connected to the acid vat 816. Once the neutralization reaction has finished in the vat 816, the acid solution is transferred to the filtration unit 821, for example by means of a valve at the bottom of the vat or an aspiration pump (not shown). Preferably, the filtration unit 821 comprises a filter with a porosity between 0.4 and 0.5 µm, preferably 0.45 µm. This filter has a membrane (sieve) resistant to acid, especially sulfuric acid, for example a polypropylene (PP) or polytetrafluoroethylene (PTFE, aka Teflon) membrane.

The device 810 comprises a regeneration unit 822 for the acid solution, which adjusts the hydrogen potential of the extracted liquid phase by adding concentrated acid contained in the acid reservoir 823.

Preferably, the regeneration unit 822 comprises a pH meter 824. The pH meter 824 measures the hydrogen potential of the acid solution during the regeneration in the regeneration unit and triggers or stops adding acid. For example, the tank 823 may comprise a valve comprising activation means based on the value detected by the pH meter 824. The valve can be activated as long as the value measured by the pH meter 824 is above a predefined limit value. The predefined limit value is preferably between zero and one. The asbestos content in the sorted waste is determined by Transmission Electron Microscopy (TEM) in a laboratory. In this way, one estimates the proportions of the chemical elements making up the type of asbestos present in the waste to be processed. The regeneration unit 822 adjusts the regenerated acid solution's hydrogen concentration and potential according to the asbestos content determined in this way. Consequently, depending on the determined asbestos content, the quantity of concentrated acid for regenerating the acid solution can be changed.

Of course, a safety factor is taken into consideration to ensure that all the asbestos is neutralized.

The device 810 comprises means for transferring the regenerated acid solution into the vat 816. The means for transferring the regenerated acid solution comprise a suction pump, for example.

The neutralized waste, once filtered in the filtration means 821, are washed and dried in a unit 825 for washing and drying the inert solids. The device comprises the washing and drying unit 825. In the washing and drying unit 825, water is projected onto the neutralized waste transformed into inert solids to remove the remaining acid. The inert solids are then dried in order to be treated.

The device 810 comprises means 826 or 827 for treating the neutralized waste transformed into inert solids. In some embodiments, the asbestos content determined before immersion of the waste in the acid and the composition of the waste direct the resulting inert solids towards different treatment means 826 or 827. For example, if the asbestos content is below forty percent for asbestos-cement type waste, the waste is neutralized to be transformed into a calcic solid called anhydrite, which can be used as an additive in cement manufacturing. According to another example, if the asbestos content is above seventy percent for lagging or flocking type waste, the inert solid obtained is a silicic solid (high silica content) which can be recycled into zeolites. In some embodiments, the treatment means 826 are means for collecting the calcic residue containing anhydrite. And the treatment means 827 are means for carrying out zeolite synthesis.

In some embodiments, the device 810 comprises a hermetic unit 812 for sorting the waste, comprising:
a window equipped with glove boxes, and
a conveyor to transport the asbestos waste behind the window.

The hermetic sorting unit 812 operates under negative pressure to prevent the release of asbestos fibers into the outside environment.

The hermetic sorting unit 812 comes before the vat 816. The sorting of the asbestos waste is therefore carried out before the immersion of the waste into the vat 816. On output from the sorting unit, waste that cannot be processed in the vat 816 is treated in another vat 814 with different dimensions. The asbestos waste intended for treatment in the vat 814 is neutralized but is not sent to the treatment means 826 and 827. The other waste is sent to the vat 816.

In this way, the asbestos waste is neutralized but not recycled. The waste directed towards the vat 814 is, for example, waste wood or personal protection equipment (contaminated masks, mask filters, gloves, overalls and clothing). In this way the recycling process is not contaminated with undesirable elements.

In some preferred embodiments, the device 810 comprises, means 813 for humidifying the asbestos waste before immersion in the vat 816 of diluted acid. The humidifying means 813 are sprinklers which impregnate the waste in the hermetic unit 812 with water. The humidification makes it possible to prevent dangerous dust, especially asbestos fibers, from remaining in suspension in the air. This washing water is recovered and preferably used to dilute the acid, which avoids discarding water polluted with the asbestos fibers, and ensures the neutralization of the asbestos contained in the recovered dust, thus providing a hygienic and secure process.

In some embodiments, the device 810 comprises a station 815 for grinding asbestos waste before immersion in the vat 816 of acid, which reduces the size of the waste containing asbestos to dimensions ranging from one-tenth of a millimeter to one millimeter. The grinding station 815 is located between the hermetic sorting unit 812 and the acid vat 816. The grinding station 815 comprises at least one grinder, at least one screen and/or at least one crusher. In some embodiments, the grinding station 815 comprises a shredding device not shown in FIG. 11.

In the embodiment illustrated in FIG. 11, a weighing station 830 comes before the grinding station 815, which is followed by a suction pump, transferring the ground waste towards the vat 816.

In some variants (not shown), there are automatic means for determining the asbestos content between the grinding station 815 and the vat 816, which determine the asbestos content in the ground waste.

In some preferred embodiments, the device 810 comprises an attenuation sensor 819 for the acid solution coming from the asbestos waste neutralization, and a selective precipitation unit 829 for the acid solution's liquid phase, depending on the degree of attenuation it senses, fed by the regeneration unit 822. Preferably, the acid solution is regenerated until the measured attenuation is above a predefined limit value. If the measured attenuation is greater than a predefined limit value, the acid solution is transferred to the selective precipitation unit, which causes the magnesium to precipitate as a salt or oxide, after being separated from the other, unwanted, metal ions by bringing the pH of the used acid solution to values preferably in a range of 6.5 to 9. The magnesium from the reaction in the vat is present in the precipitate and can be recovered as magnesium sulfate.

Preferably the attenuation sensor is a pH or ionic activity sensor (preferably an ion-selective electrode). Preferably, the attenuation depends on the concentration of magnesium in the acid solution.

The cycle 935 of the initial acid solution is shown in FIG. 12. The x-axis represents time and the y-axis represents the percentage of magnesium ions and the percentage of $H^+$ ions in the acid solution. The percentage scales are not the same, since the percentage of $H^+$ ions is higher than the percentage of magnesium ions.

At the start of a first phase 936A, the acid solution is introduced and heated in the vat 816, and the waste containing ground asbestos is introduced into the vat 816. During the first reaction, phase 936A, the percentage of magnesium ions in solution increases, whereas the percentage of $H^+$ ions decreases. After a period of time, the asbestos is neutralized, and these percentages no longer change. During the regeneration of the acid solution, phase 937A, the initial content of $H^+$ ions is restored and the concentration of magnesium ions in solution decreases slightly, because of the dilution caused by adding acid.

Phases 936B and 937B correspond to phases 936A and 937A, except that the acid solution is initially doped with magnesium ions.

Phase 936C corresponds to phase 936B, except that the acid solution regenerated to start phase 936C is initially doubly doped with magnesium ions.

A probe in the form of an ion-selective electrode dipped into the acid solution estimates the content of magnesium ions in the solution (by ionic activity).

If, at the end of a neutralization phase, the magnesium ion content exceeds a predefined limit value 938, the acid solution is no longer regenerated but one recovers the magnesium ions by precipitating them in the form of a salt or oxide after steps of separation from the other unwanted metal ions by selective precipitation. In this way, all the magnesium is recycled for reuse.

Alternatively, one measures the consumption of the $H^+$ ions by means of a pH meter, or the consumption of acid required for the regeneration of the acid solution, as this consumption is representative of the quantity of magnesium coming from the neutralization of the asbestos. When the total consumption of acid during the successive regenerations of the acid solution reaches a predefined limit value, one stops the cycle and makes the magnesium ions precipitate. In FIG. 12, it is assumed that, from phase 936C, the predefined limit value has been reached.

For example, the predefined limit value corresponds to an interval of 12 to 14 grams of magnesium per liter of acid solution.

Returning to FIG. 11, in some embodiments, the device 810 comprises means for recovering the washing water to use it for diluting the acid in the vat 816. The recovered water is supplied to the regeneration unit 822.

In some embodiments, especially for a shipborne unit, the device 810 comprises means 828 for desalinating sea water to supply water used to sprinkle on the asbestos waste in the sorting unit, to produce the diluted acid aqueous solution, or to wash the inert solids after neutralization. The desalination means 828 preferably also supplies water to the regeneration means 822 and the waste sorting unit 812.

Preferably, the device 810 comprises a control unit 811 that controls the values of the various operating parameter of the device 810, such as:

the agitator's rotational speed, starting and stopping the grinding station 815 depending on the mass of the waste that has already entered into the reaction vat 816, inserting waste into the vat 816, starting and stopping the heating means 820 and the means for humidifying 813, washing and drying 825 and desalinating water 828, the quantity of water or acid to be added to the acid solution for the regeneration of the acid solution as a function of the hydrogen potential sensed by the pH meter 824, and triggering the precipitation of the acid solution as a function of the measured attenuation of the acid solution.

The control unit 811 takes into account the data from the various sensors, such as the hydrogen potential from the pH meter 824, the attenuation of the acid solution measured by the attenuation sensor 819, the temperature of the acid solution, the mass of waste introduced, the mass of waste filtered, for example.

The control unit 811 also provides traceability of the asbestos elements admitted into the treatment unit.

The control unit 811 makes it possible to create a reference database where the waste treated in the neutralization units is cataloged, for example according to:

the typology of the waste the nature of the waste the source of the waste (worksite)

the composition the king of asbestos contained in this waste etc.

The treatment unit uses an approach for neutralizing asbestos waste (irrespective of its typology) in short timescales (always under 24 hours) by immersing it in an acid solution at temperatures below the boiling temperature of the acid solution, eg 104° C., preferably below 100° C., preferably above 70° C. and even more preferably above 80° C.

Preferably, the acid used is sulfuric acid, which has shown the best neutralization results on asbestos waste.

The most used variety of asbestos being chrysotile (over 95%), its crystallographic structure is in the form of a stack of silicates sheets (tridymite structure) and brucite sheets $Mg(OH)_2$.

During the acid attack, the acid reacts with hydroxylic compounds $(OH)^-$ and brucite fibers $Mg(OH)_2$ which results in their disappearance (dissolution of Mg) and therefore the amorphization of asbestos waste which transforms into an inert solid made up of amorphous silica. The magnesium passes into the liquid fraction and will be recovered in the form of a salt or oxide, preferably in the form of magnesium sulfate or magnesium oxide.

The invention claimed is:

1. A system for asbestos neutralization, that comprises a neutralization unit comprising, in an atmospheric containment:

a module configured for sorting of asbestos waste, an asbestos waste grinder, which is configured reduces the size of the asbestos waste to a dimension ranging from one-tenth of a millimeter to one millimeter, a concentrated sulfuric acid tank, a vat containing a hot diluted acid solution, for which temperature is between 70° C. and 100° C., in which grinded asbestos waste containing asbestos is dipped, said solution is configured for neutralizing asbestos contained in the grinded asbestos waste, a filtration unit to separate, at the end of the neutralization reaction, a solid inert waste from a liquid phase of the diluted acid solution, a regeneration unit for the diluted acid solution, which adjusts the hydrogen potential of the extracted liquid phase by adding concentrated sulfuric acid from the tank, and means for transferring the regenerated solution into the vat.

2. A system according to claim 1, that further comprises an attenuation sensor that measures the attenuation of the diluted acid solution, said attenuation sensor comprising an ion-selective electrode, and an extractor that extracts by-products of the attenuated diluted liquid phase by selective precipitation of the filtered liquid phase, the regeneration unit being activated as long as the measured attenuation is below a predefined limit value, the extractor being activated when the measured attenuation is above the predefined limit value.

3. A system according to claim 1, that further comprises means for determining a type and/or content of asbestos in the asbestos waste prior to dipping in the vat, the regeneration unit adjusting the hydrogen potential of the regenerated acid solution depending on the type and/or content of asbestos.

4. A system according to claim 1, that further comprises an exterior closed loop connected to the vat and having means for cooling the vapors on exit from the vat and means for recovering resulting water for preparing the diluted acid solution.

5. A system according to claim 1, that further comprises a water washing and drying unit for the neutralized waste transformed into inert solids and means for recovering the washing water for the preparation of the diluted acid solution.

6. A system according to claim 1, wherein the module for sorting of asbestos waste comprises:
    a workbench,
    a window equipped with glove boxes,
    a conveyor to transport the waste in front of the window and
    a metal detection unit.

7. A system according to claim 1, wherein the neutralization unit further comprises:
    a tank for fresh water;
    a tank for used water;
    a decontamination chamber for the operator;
    a chamber for introduction of asbestos waste and
    a chamber for evacuation of non-asbestos waste issued from the sorting process.

8. A system according to claim 1, that further comprises a supply unit comprising:
    a means for the dismounting of a tank from the neutralization unit containing used diluted acid from the vat,
    a means for the loading of a tank of pre-heated diluted acid solution into the neutralization unit,
    a means of emptying a tank of used water or for exchanging the tank of used water with an empty tank,
    a means of filling a tank with fresh water or for exchanging the tank of fresh water with an empty tank.

9. A system according to claim 1, that further comprises a microwave that heats the vat.

10. A system according to claim 1, wherein the filtration unit further comprises an extractor of magnesium compounds from the solid inert waste.

11. A system according to claim 1, wherein the filtration unit further comprises a means of producing Anhydrite from the solid inert waste.

12. A system according to claim 1, wherein the filtration unit further comprises a means of producing material presenting mesopores of which at least 10% have a diameter inferior to 20 Å from the solid inert waste.

13. A system according to claim 1, wherein the filtration unit further comprises a means of fabrication of zeolites from the solid inert waste.

14. A system according to claim 1, that further comprises a humidifier for humidifying the asbestos waste before dipping in the vat.

15. A system according to claim 1, that further comprises desalinator for desalinating water, said desalinated water being used to dilute the concentrated acid from the tank to provide diluted acid solution to the vat.

* * * * *